(12) United States Patent
Rajimwale et al.

(10) Patent No.: US 11,520,744 B1
(45) Date of Patent: Dec. 6, 2022

(54) UTILIZING DATA SOURCE IDENTIFIERS TO OBTAIN DEDUPLICATION EFFICIENCY WITHIN A CLUSTERED STORAGE ENVIRONMENT

(71) Applicant: EMC IP Holding Company LLC, Hopkinton, MA (US)

(72) Inventors: Abhishek Rajimwale, San Jose, CA (US); George Mathew, Belmont, CA (US); Murthy Mamidi, San Jose, CA (US); Donna Barry Lewis, Holly Springs, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 167 days.

(21) Appl. No.: 16/547,346

(22) Filed: Aug. 21, 2019

(51) Int. Cl.
*G06F 16/17* (2019.01)
*G06F 16/174* (2019.01)
*G06F 16/901* (2019.01)
*G06F 11/14* (2006.01)

(52) U.S. Cl.
CPC ...... *G06F 16/1748* (2019.01); *G06F 11/1453* (2013.01); *G06F 11/1464* (2013.01); *G06F 16/901* (2019.01)

(58) Field of Classification Search
CPC ............... G06F 16/1748; G06F 3/0641; G06F 11/1453; G06F 11/1448; G06F 16/174; G06F 11/1464; G06F 16/901; G06F 16/122; G06F 11/1446; G06F 16/1752; G06F 16/1756; G06F 16/182; G06F 16/1824; G06F 16/1827; G06F 16/184; G06F 16/1844; G06F 11/1451; G06F 16/1453

See application file for complete search history.

(56) References Cited

U.S. PATENT DOCUMENTS

| | | | |
|---|---|---|---|
| 8,315,992 B1 * | 11/2012 | Gipp | G06F 11/1453 707/692 |
| 8,898,120 B1 * | 11/2014 | Efstathopoulos | G06F 16/11 707/692 |
| 9,298,707 B1 * | 3/2016 | Zhang | G06F 11/1453 |
| 9,659,021 B1 * | 5/2017 | Dobrean | G06F 16/13 |
| 2009/0182789 A1 * | 7/2009 | Sandorfi | G06F 11/1004 |
| 2010/0077161 A1 * | 3/2010 | Stoakes | G06F 11/1453 711/E12.103 |
| 2010/0100530 A1 * | 4/2010 | Nadathur | G06F 11/1448 707/640 |

(Continued)

*Primary Examiner* — Truong V Vo
(74) *Attorney, Agent, or Firm* — Dergosits & Noah LLP; Todd A. Noah

(57) ABSTRACT

Described is a system (and method) that intelligently distributes data within a clustered storage environment. To provide such a capability, the system may distribute backup files by considering a source of the data to be backed-up. In particular, the system may leverage the ability of front-end components such as a backup application to perform a granular data source identification of data. Such information may be propagated to back-end components such as a storage filesystem in the form of a data source identifier (e.g. placement tag). The data source identifiers may then be accessed by the clustered storage system to intelligently distribute backup files amongst a set of storage nodes forming a cluster. For example, backup files from the same data source may be stored on the same storage node to obtain the same deduplication efficiency as a single storage system.

17 Claims, 6 Drawing Sheets

(56) References Cited

U.S. PATENT DOCUMENTS

| | | | |
|---|---|---|---|
| 2010/0312752 A1* | 12/2010 | Zeis | G06F 11/1464 |
| | | | 707/640 |
| 2011/0022642 A1* | 1/2011 | deMilo | G06F 21/602 |
| | | | 707/805 |
| 2015/0088841 A1* | 3/2015 | Fuglsang | G06F 16/215 |
| | | | 707/692 |
| 2015/0134717 A1* | 5/2015 | Naganuma | G06F 11/1464 |
| | | | 709/201 |
| 2016/0132523 A1* | 5/2016 | Traeger | G06F 16/1748 |
| | | | 707/692 |
| 2017/0228290 A1* | 8/2017 | Maccanti | G06F 11/1451 |
| 2019/0004727 A1* | 1/2019 | Volvovski | G06F 16/215 |
| 2019/0286738 A1* | 9/2019 | Wong | H04L 67/1008 |

* cited by examiner

UTILIZING DATA SOURCE IDENTIFIERS TO OBTAIN DEDUPLICATION EFFICIENCY WITHIN A CLUSTERED STORAGE ENVIRONMENT

TECHNICAL FIELD

This disclosure relates to managing deduplicated backup data, and more particularly, utilizing data source identifying information to achieve deduplication efficiency within a clustered storage environment.

BACKGROUND

Clustered storage systems employ various techniques for distributing data across a set of nodes of a cluster. For example, incoming data may be divided into chunks that are distributed evenly across the set of nodes to balance storage capacity and resource utilization. However, in a clustered storage system that supports deduplication, evenly distributing chunks of data across the set of nodes may create deduplication inefficiencies. For example, a clustered storage system may employ a global namespace that represents the storage system as a single storage unit to external components. Accordingly, multiple generations of related data may be stored on different nodes of the cluster leading to a loss of deduplication efficiency. Accordingly, there is a continued need to efficiently manage deduplicated data in a clustered storage environment.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Figure 1:
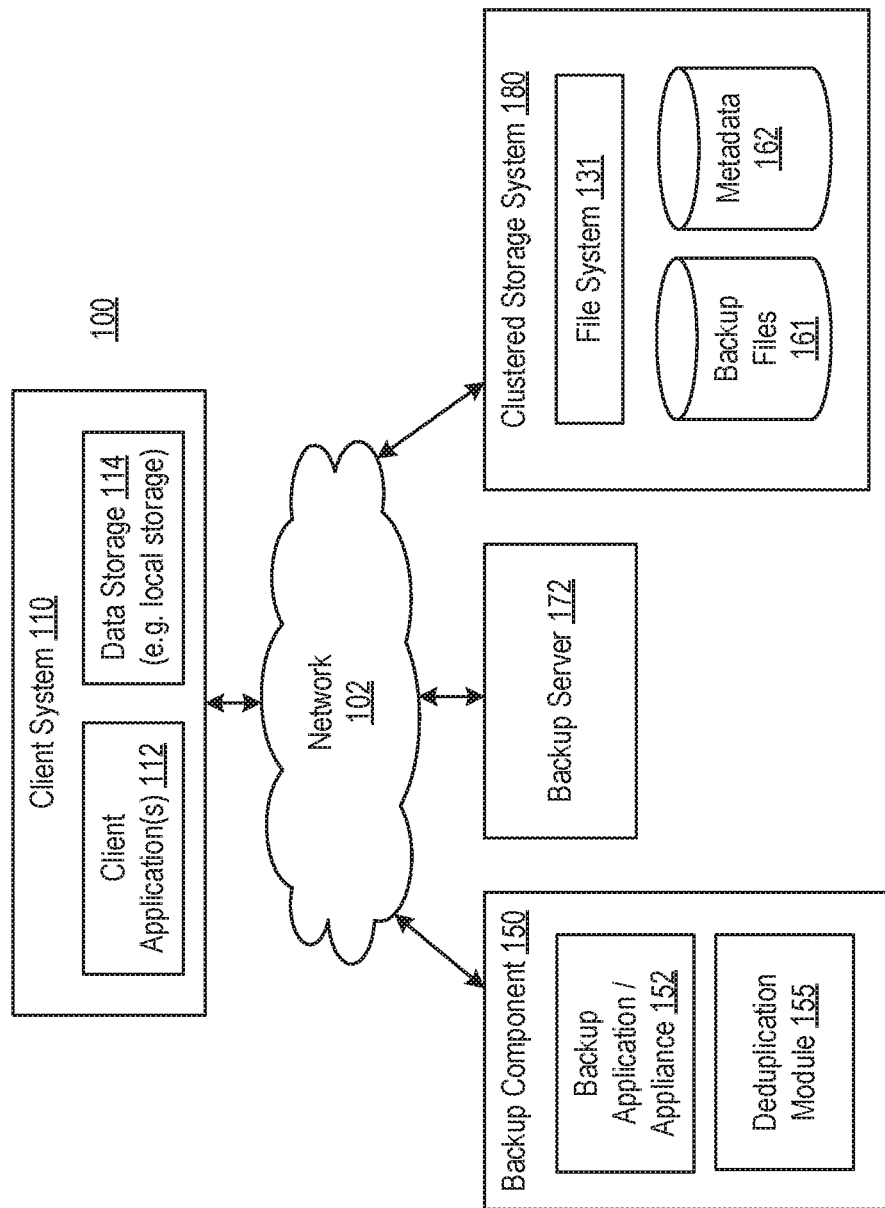
FIG. 1 is a block diagram illustrating an example operating environment for using data source information to distribute data within a clustered storage system according to one or more embodiments of the disclosure.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

In some embodiments, described is a system (and method) for intelligently distributing data within a clustered storage environment that obtains deduplication efficiency comparable to a single storage system. To provide such a capability, the system may distribute backup files by considering a source of the data. By identifying a source of the backup data, the system may predict (e.g. to a certain degree of certainty) that certain backup files contain related data. For example, generations of backup data created from a shared data source may be associated with a common data protection set (e.g. data for a particular application, client/customer, etc.). Accordingly, the system may ensure (e.g. to an extent determined by a predefined distribution policy) that data originating from a particular data source is stored together on the same deduplication domain. Accordingly, the clustered storage system may obtain a higher degree of deduplication efficiency as the likelihood of data being related (e.g. deduplicable) may increase if originating from the same data source.

More particularly, in some embodiments, the system may leverage the ability for front-end components such as a backup application to access various types of information from a client server from which backup data originates. This information may be used to perform a granular data source identification for the backup data. Accordingly, the identifiers for data sources may be passed along to the back-end components such as a storage filesystem. The stored data source identifiers may then accessed to intelligently distribute data within the clustered environment. For example, backup files from the same source (e.g. sharing a data source identifier) may be stored on the same deduplication domain (e.g. the same storage node or data partition).

In some embodiments, such a system may be provided within an operating environment. An example of such an operating environment is further described herein with reference to FIG. 1. However, in general, embodiments of the disclosure may include and/or be implemented in an operating environment including a cloud services environment that may be, or include, a data protection operating environment that includes a backup and clustered storage environment. For example, at least some functionality may be provided by, or implemented in connection with, various platforms such as the Dell/EMC Data Domain™ data protection platform, and associated systems, methods, and components, although use of this particular platform is provided only by way of illustration and is not required.

In some embodiments, the storage environment may take the form of a cloud storage environment. However, embodiments of the disclosure may also be implemented for an on-premises storage environment, and hybrid storage environments that include public and private elements, as well as any other type of storage environment. In addition, any of these cloud environments, or other operating environments, may take the form of an operating environment that is partly, or completely, virtualized. The storage environment may include one or more host devices that each host one or more applications used by a client of the storage environment. As such, a particular client may employ, or otherwise be associated with, one or more instances of each of one or more applications. In general, the applications employed by the clients are not limited to any particular functionality or type of functionality. Some example applications may include database applications (e.g. a SQL Server), filesystems, as well as other types of data stores. The applications on the clients may generate new and/or modified data that is desired to be protected.

Any of the devices, including the clients, servers and hosts, in the operating environment can take the form of software, physical machines, or virtual machines (VM), or any combination thereof, though no particular device implementation or configuration is required for any embodiment. Similarly, data protection system components such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term "data" is intended to be broad in scope. Accordingly, data may include data objects (or objects), data segments such as may be produced by data stream segmentation processes, data chunks, data blocks, atomic data, emails, files, contacts, directories, sub-directories, volumes, etc. In addition, the term "backup data" or "backup file" (or "data backups," "backed-up data," etc.) is intended to be construed broadly and includes, but is not limited to, partial backups, incremental backups, full backups, clones, snapshots, any other type of copies of data, and any combination of the foregoing. Any of the foregoing may, or may not, be deduplicated. In addition, the storage of data can employ any suitable storage technique, infrastructure, hardware (e.g. Solid State Drive (SSD), Hard Disk Drive (HDD)), or on virtual storage systems provided by a cloud service provider, etc.

More specifically, and with reference to FIG. 1, shown is a block diagram illustrating an example of an operating environment 100 for using data source information to distribute data within a clustered storage system according to one or more embodiments of the disclosure. As shown, the environment 100 may include a client system 110, backup system 150, backup server 172, and a clustered storage system 180. It should be noted that the components of operating environment 100 may interact via a network 102, which may be any type of wired or wireless network including a local area network (LAN), a wide area network (WAN), or a direct communication link, or other suitable connection.

As shown, the operating environment 100 may include a client or client system (or computer, or device) 110 that may be associated with a client or customer of a data backup and protection service, and a backup system 150 that may be associated with a data backup and protection service provider. For example, the client system 110 may provide computing resources (e.g. webservers, databases, etc.) for users (e.g. website visitors) of the customer, data from which may be protected by the backup and data protection service provider. Accordingly, the client system 110 may act as a client from which backups are performed. In some embodiments, the client system 110 may comprise a virtual machine. In addition, the client system 110 may host one or more client applications 112, and may include data storage 114, as well as an interface for communicating with other systems and devices, such as the backup system 150. In general, the client applications 112 may create new and/or modified data that is desired to be protected. As such, the client system 110 is an example of a host device. The data storage 114 can be used to store client data, which may, along with the client system 110 (e.g. client applications 112) may be backed up using the backup system 150. As further described herein, components of the client system 110 (e.g. client applications 112, data storage 114, etc.) may be a data source, or be associated with, one or more data sources such as a database, VM, storage device, etc. In addition, components of the client system 110 may be data sources that are associated with the client system 110, but reside on separate servers such as a data server, or a cloud-computing infrastructure. The client system 110 may include a backup client application, or plug-in application, or API that cooperates with backup system 150, to create backups of client data. The backed-up data can also be restored to the client system 110.

In one embodiment, backup component 150 may represent one or more components of a Data Domain™ Restorer (DDR)-based deduplication storage system, and backup server 172 may be implemented in conjunction with a Data Domain deduplication storage server provided by Dell/EMC™ Corporation for use with DDR storage devices. For example, the backup server 172 may be a stand-alone entity, or can be an element of the clustered storage system 180. In some embodiments, the backup server 172 may be an EMC Corp. Avamar server or an EMC Corp. Networker server, although no particular server is required, and other backup and storage system configurations are contemplated.

The backup component 150, may include a backup application (or appliance) 152 that performs (or manages, coordinates, etc.) the creation and restoration of data that may be backed-up. For example, data to be backed-up from the client system 110 may be communicated from the client system 110 to the backup application 152 for initial processing, after which the processed data is uploaded from the backup application 152 for storage at the clustered storage system (e.g. as backup data 161). In some embodiments, the backup application 152 may cooperate with a backup client application of the client system 110 to back up client data to the clustered storage system 180. A backup application 152 may also cooperate with a backup client application to restore backup data from the clustered storage system 180 to the client system 110. In some embodiments, the backup application 152 may be a part of, or work in conjunction with, a storage appliance. For example, the storage appliance may include a Dell-EMC CloudBoost appliance, although any suitable appliance is contemplated. In addition, the backup application 152 may provide a variety of useful functionalities such as source-side data deduplication, data compression, and WAN optimization boost performance and throughput while also possibly reducing the consumption and cost of network bandwidth and cloud storage capacity. One, some, or all, of these functions of the backup application 152 may be performed using deduplication logic via deduplication module 155. For example, the deduplication module 155 can provide data segmentation, as well as in-flight encryption as the data is sent by the storage application 152 to the clustered storage system 180. It should be noted that the backup application (or storage appliance) 152 can be implemented in various forms, such as a virtual, physical, or native public cloud appliance to fit the requirements of a particular configuration, and the backup application 152 can be used with various types of data protection environments, including public and private object storage clouds.

The clustered storage system 180 (as further described herein) may store backup files 161 within a one or more nodes (as further described herein). As shown, the clustered storage system 180 may also store metadata 162 for (or associated with) the backup files 161, and one or more instances of a filesystem 131 that catalogs backup files and other data residing in the clustered environment. In general, the storage of backup files 161 may be configured to store client system 110 data backups that can be restored in the event of a loss of data.

Figure 2:
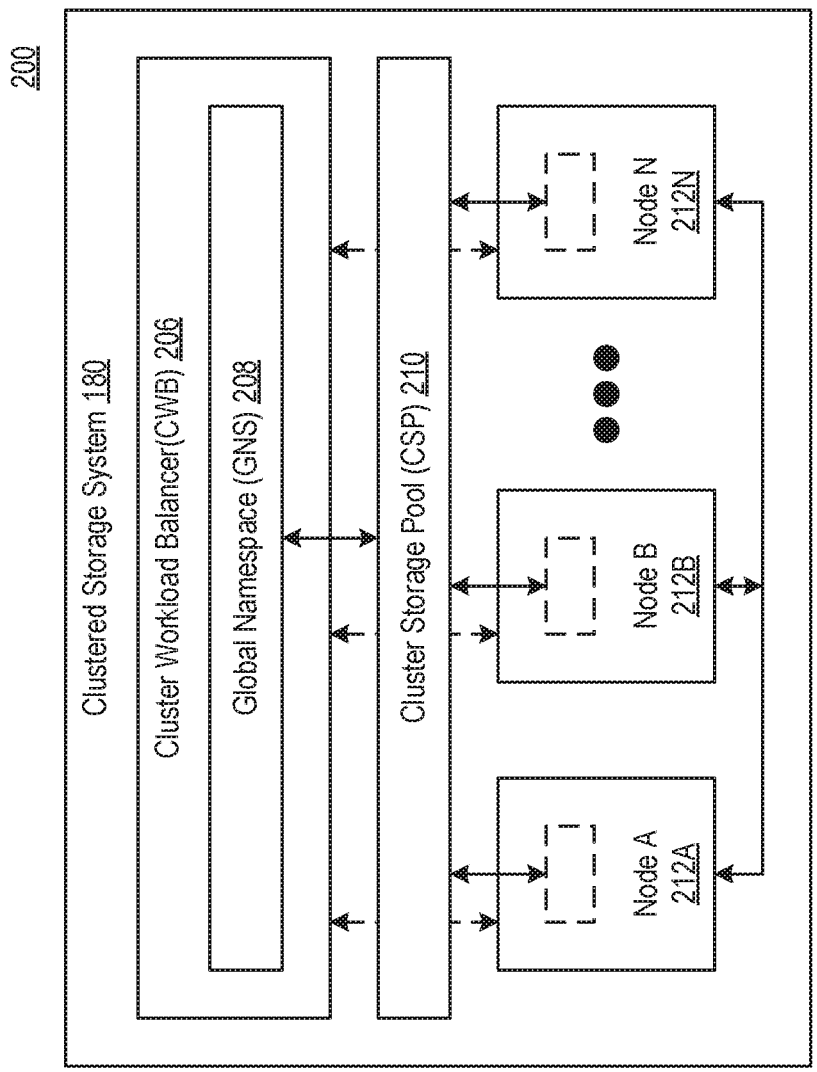
FIG. 2 is a block diagram illustrating an example clustered storage system according to one or more embodiments of the disclosure.

FIG. 2 is a block diagram 200 illustrating an example clustered storage system according to one or more embodiments of the disclosure.

The clustered storage system 180 may represent a deduplicated cluster storage system (or service), distributed storage system (or service), distributed file system (or service), etc. As shown, the clustered storage system 180 may include, or represent, a group of linked nodes (or storage nodes) 212A-N, which may be configured to share resources. The shared resources may include computing resources (e.g. computer processors and memory), storage resources (e.g. persistent data storage), and network resources (e.g. traffic bandwidth). Further, the sharing of any resource may entail virtualizing the resource in each node to create a logical pool of that resource that spans, and is made available to all nodes (e.g. nodes 212A-N), across the clustered storage system 180. For example, when considering storage resources, the physical device (e.g. HDDs, SSDs, etc.) representative of the local storage resources on each node may be virtualized to form a globally-accessible cluster storage pool (CPS) 210. Accordingly, the CPS 210 may represent a logical pool of disk capacity formed from all storage resources across the clustered storage system 180.

In some embodiments, a node 212 may represent a physical computing system dedicated to storing backup files, processing workloads, and other operations. For example, processing workloads may include processing service requests submitted to the clustered storage system 180 such as receiving file operation requests delegated from the cluster workload balancer (CWB) 206, processing the file operation requests (e.g. write requests as further described herein), and returning file operation responses back to the CWB 206 based on results obtained from processing the file operation requests. It should be noted that a node 212 may perform other functionalities without departing embodiments of the disclosure.

In some embodiments, the clustered storage system 180 may include a cluster workload balancer (CWB) 206. The CWB 206 may represent a physical computing system dedicated to distributing service traffic across the various nodes of the clustered storage system 180. This distribution of service traffic (also referred as load balancing) may reduce individual node (212A-N) workload, may prevent any one node from becoming a single point of failure, and may improve the responsiveness and availability of the deduplicated storage service provided by the clustered storage system 180. To the extent of load balancing, the CWB 206 may include the following functionalities: monitoring and tracking resource availability, for any given point in time, across the various nodes, receiving file operation requests from the upstream components (e.g. backup component 150, backup server 172, etc.); selecting the best available nodes to process the file operation requests based on the tracked resource availability; delegating the file operation requests to the best available nodes for processing; receiving file operation responses from the best available nodes; and forwarding the file operation responses to the requesting components.

In some embodiments, the CWB 206 may also represent a single point of contact, for the clustered storage system 180, with which components (e.g. of environment 100) may interface. In some embodiments, the clustered storage system 180 may maintain a global namespace (GNS) 108, which may be managed by the CWB 206. The GNS 208 may refer to an abstraction that unifies the various local filesystems, maintained by the various nodes (212A-N) across the clustered storage system 180, into a single virtualized global filesystem. The single virtualized global filesystem may subsequently be presented to the components in order to simplify the management and accessibility of storage and/or data across the clustered storage system 180, which may be aggregated in the form of the CPS 210.

Figure 3:
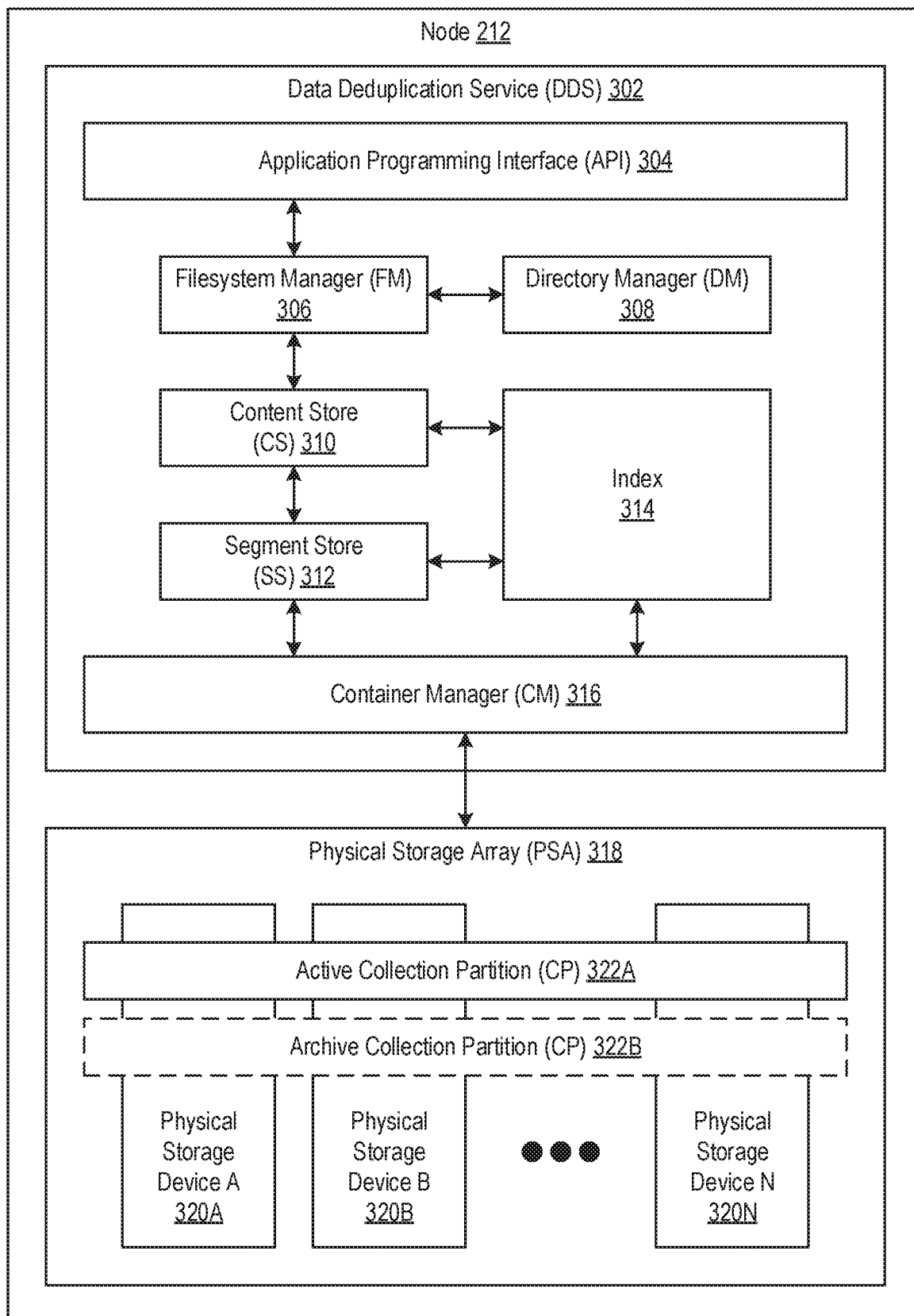
FIG. 3 is a block diagram illustrating an example storage node according to one or more embodiments of the disclosure.

FIG. 3 is a block diagram 300 illustrating an example storage node according to one or more embodiments of the disclosure. As shown a node 212 may include a data deduplication service (DDS) 302 operatively connected to a physical storage array (PSA) 318.

In some embodiments, the DDS 302 may represent a component that may be responsible for consolidating and/or retrieving data (e.g. backup files from the PSA 318). In some embodiments, the DDS 302 may perform such responsibilities while performing data deduplication. In some embodiments, the DDS 302 may include an application programming interface (API) 304, a filesystem manager (FM) 306, a directory manager (DM) 308, and a content store (CS) 310, a segment store (SS) 312, an index 314, and a container manager (CM) 316. Each of these DDS 302 subcomponents is described below.

The API 304 may represent an interface through which external entities such as the cluster workload balancer (CWB) 206 and other nodes 212 in a cluster may interact with the DDS 302. Accordingly, the API 304 may employ a set of subroutine definitions, protocols, and/or tools directed to enabling communications between the DDS 302 and the external entities. For example, the API 304 may performing functionalities including: receiving file operation requests delegated from the CWB 206; extracting file operations and operation-pertinent arguments (OPA) from the file operation requests; invoking the FM 306 using the file operations and the OPA, to process the file operation requests; receive remote procedure calls (RPC) from the FM 306 for transmission to one or more specified other nodes; receive remote procedure reports (RPR) from other nodes in response to RPC transmitted beforehand; invoking the FM 306 using the RPR; receiving file operation responses from the FM 306; and transmitting the file operation responses, disclosing results (if any) concerning earlier delegated file operation requests, to the CWB. It should be noted that additional functionalities are also contemplated.

The FM 306 may represent a component responsible for the coordination of DDS 302 operations. To that extent, the FM 306 may include functionality to: receive file operations delegated to the node 212 for processing; invoke other DDS 302 subcomponents (e.g. the DM 308 and the CS 310) towards processing received file operations; issue remote procedure calls (RPC) to other (remote) nodes; and issue file operation reports based on results yielded from processing received file operations. In addition, the FM 306 may include functionality to maintain, lookup, and update a local redirection cache. In one embodiment, the FM 306 may include functionality to indicate which file segments (e.g. unique blocks or chunks of data) pertain to a file. These file segments may be identified as a list of fingerprints (or hashes) representative of the file segments.

The DM 308 may represent a component responsible for the management of files in one or more filesystems across the clustered storage system 180. To that extent, the DM 308 may include functionality to maintain, traverse, and update one or more namespace trees. For example, a namespace tree may represent a hierarchical data structure directed to reflecting the way files and/or directories may be identified and stored in data storage (e.g. the PSA 318).

The CS 310 may represent a component responsible for the management of file content associated with various files consolidated in the PSA 318. To that extent, the CS 310 may include functionality to maintain, traverse, and update various segment trees. For example, a segment tree may refer to a Merkel tree, or a hierarchical data structure, for identifying and tracking the locations of file segments, pertinent to a single file, stored in the physical storage devices (320A-N) of the PSA 318. If the PSA 318 is formed from one physical storage device (320A-N), the locations of the pertinent file segments may be indicated through disk offsets. Alternatively, if the PSA 318 is formed from multiple physical storage devices (320A-N), the locations of the pertinent file segments may be indicated through physical storage device (320A-0N) identifiers in addition to disk offsets.

The SS 312 may represent a component responsible for assessing whether new file segments, yielded from the CS 310, may already be stored. Should new file segments be stored already, metadata for those new file segments, rather than the new file segments themselves, may be stored to optimize storage space utilization. In conjunction with the CS 310, the SS 312 may include functionality to execute data deduplication on the node 212.

The index 314 may represent a data structure that may be used to locate stored file segments within one or more physical storage devices (320A-N) of the node 212. More specifically, the index 314 may include associations that map fingerprints (or hashes) to storage locations that consolidate the file segments that which the fingerprints represent.

The CM 316 may represent a component responsible for the management and tracking of containers. A container may refer to a logical grouping of compression regions consolidated in data storage (e.g. PSA 318). Each compression region, in turn, may encompass a compressed and/or archived data object that stores one or more file segments and their associated metadata within.

Returning to the node 212 components, in some embodiments, the PSA 318 may represent a collection of one or more physical storage devices (320A-N) on which various forms of information (e.g. backup files) may be stored and/or consolidated. Examples of a physical storage device (320A-N) may include, but are not limited to, a hard disk drive (HDD), a solid state drive (SSD), and network attached storage (NAS), etc. An active collection partition (CP) 322A may be implemented and span across at least a subset of the physical storage devices (320A-N) of the PSA 318. Accordingly, the active CP 322A may represent a logical storage pool wherein a collection of files stored therein dedupes only with other files in the logical storage pool. In some embodiments, an archive CP 322B may also be implemented and span across at least another subset of the physical storage devices (320A-N). In contrast to the active CP 322A, which may store frequently accessed and/or recently created files, the archive CP 322B may represent a logical storage pool wherein aged, seldom accessed files may reside and dedupe with other aged, seldom accessed files.

Figure 4:
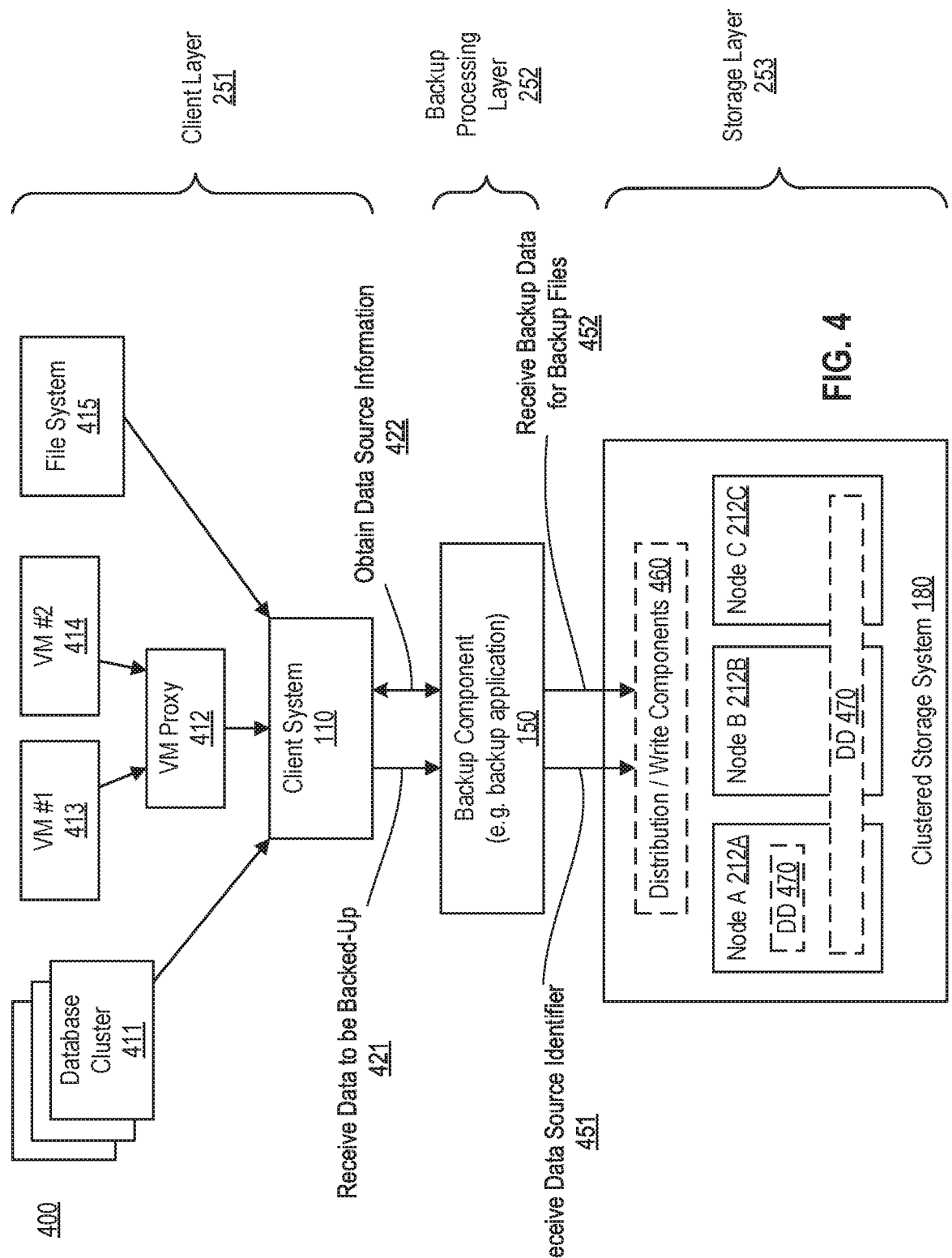
FIG. 4 is a block diagram illustrating an example interaction between components for using data source information to distribute data within a clustered storage system according to one or more embodiments of the disclosure.

FIG. 4 is a block diagram 400 illustrating an example interaction between components for using data source information to distribute data within a clustered storage system according to one or more embodiments of the disclosure. As shown, a client system (or client server) 110 may be associated with one or more data sources (e.g. data sources 411-415). The data sources may be part of, or work in conjunction with, the client system 110. For example, the data sources may be part of a separate server, or part of a cloud storage infrastructure. Accordingly, the client system 110 and the data sources may be part of a client layer 251 that provides data to be backed-up by a backup component (or backup application) 150 that is part of a backup processing layer 252. As shown, the client system 110 may provide (or transmit, send, transfer, forward, etc.) data to be backed-up (e.g. raw data) to the backup component 150 as part of a backup process. In some embodiments, data may be sent to the backup component 150 at various time points as part of a backup schedule (e.g. hourly, daily, etc.).

Accordingly, as shown in 421, the backup component 150 may receive data to be backed-up from the client system 110 and may process such data to initiate the creation of one or more backup files. In some embodiments, only the backup component 150 may be able to communicate with the client layer 251. For example, the backup component 150 may only be able to access a client system 110 that acts as a proxy (or intermediary) to obtain such data from the data sources. In response to receiving the data, as shown in 422, the backup component 150 may obtain data source information associated with the received data from the client system 110. The data source information may include any form of information that may be used (directly or indirectly) to create an identifier (or unique identifier) for a data source. For example, the data source identifier may include a device (or host) address (e.g. IP, network, or MAC address, etc.), an identifier (e.g. VM ID, database ID, storage ID, etc.), or other form of identifier (e.g. device name, customer ID, client ID, etc.). In some embodiments, a data source identifier may be generated. For example, a hash value may be generated from the data source information and be associated with a particular data source. For example, an IP address of a data server may be used to generate a unique hash value associated with the data server.

In some embodiments, the data source identifier may identify a more granular (e.g. specific) data source than the more general client system 110 that may be associated with multiple data sources. For example, as shown, the data to be backed-up (e.g. application data, operating system data, database records or objects, etc.) may originate from more than one VM (e.g. VMs 413 and 414) via a VM Proxy 412, and therefore, the data source identifier may include the particular VM ID (e.g. VM ID for VMs 413 or 414) instead of the VM ID for VM Proxy 412. As another example, as shown Cluster Database 411 may include several databases (or databases instances), and accordingly, the data source identifier may be a database ID for a particular database or instance within the cluster.

In order to obtain such granular identifying information, the backup component 150 may leverage the ability to access components of the client system 110 in a manner unavailable to the storage layer 253. For example, the backup component 150 may be authorized to access (e.g. via an API) a particular client layer 251 component such as a particular data source, client system 110, client system application, etc. and act as an intermediary to transfer data source information to the clustered storage system 180. The backup component 150 may obtain the data source information as part of the backup process (e.g. the operation that transmits data to the backup component 150), or as a separately initiated operation. For example, the separately initiated operation may include directly accessing (e.g. querying) the client system 110, data sources 411-415, or associated component to obtain data source information. For instance, the backup component may query a VM proxy (e.g. VM proxy 412) of the client system 110 to obtain data source identification information of a particular VM ID of a VM (e.g. VMs 413 or 414) that is associated with data to be backed up.

In some embodiments, the backup component 150 may have access to a particular client layer 251 API to obtain such granular data source information. For example, backup component 150 may work in conjunction with a client component such as a client backup application or plug-in that resides within the client layer 251. Accordingly, the backup component 150 may access an API provided by an associated plug-in to obtain data source information.

In some embodiments, the client system 110 may provide (e.g. transmit, transfer, send, etc.) data to the backup component 150 via a protocol (e.g. backup, storage, or transfer protocol, etc.). For example, a backup protocol may include the OST (OpenStorage Technology) protocol that may include an API that allows components (e.g. NetBackup Media servers) to interact with storage devices including cloud-computing storage devices. Accordingly, in some embodiments, information included as part of a protocol may be used as a basis for the data source identifying information. For example, the backup component 150 may parse information included as part of the protocol transmission to obtain information such as data source information (e.g. particular database identifier) or destination (or target) of the data (e.g. particular backup component endpoint).

After deriving one or more data source identifiers, the backup component 150 may associate a particular data source identifier with portions of data received from the client system 110. For example, the backup component may determine a portion of data received from the client system 110 may be used to create a particular backup file. Accordingly, the backup component may obtain data source information for the particular portion of data and generate a data source identifier associated with the particular portion of the data that is used to create a backup file.

In some embodiments, the backup component 150 may provide data to the clustered storage system 180 by requesting the clustered storage system to write (or create) particular backup files. As described, the backup component 150 may perform processing of the data (backup files). In some embodiments, the cluster storage system 180 may perform certain data processing functions such as the deduplication. For example, as described, nodes (e.g. nodes 212A-C) may host a component stack (e.g. software stack) that includes a file system with deduplication capabilities. Irrespective of the particular configuration, the backup component 150 may transmit backup data to be stored by the clustered data storage system 180 along with the data source identifiers.

As shown, the clustered storage system 180 may include the storage nodes 212 (e.g. storage nodes 212A-C), and related components that may form a storage layer 253. As shown, a deduplication domain (DD) 470 may be a particular storage node, a partition within a particular node, or a storage partition associated with one or more storages nodes (e.g. a partition spanning multiple nodes). In some embodiments, a deduplication domain 470 may correspond to one or more physical storage devices (e.g. physical storage device 320). The distribution/write components 460 may work in conjunction with, or be a part of, nodes 212. For example, the distribution components may be part of a component stack (e.g. software stack) that may include one or more of the cluster workload balancer (CWB) 206, data deduplication service (DDS) 302, API 304, etc. In one embodiment, the distribution/write components 460 may include an API or plug-in, that acts as a layer that the backup application may access to perform file operations as described herein with components of the clustered storage system 180.

In previous systems, distributing backup files or data amongst a deduplication domain (e.g. a set of nodes) may have been strictly based on resource utilization such as storage capacity, CPU usage, bandwidth etc. However, in some embodiments described herein, the clustered storage system 180 may distribute backup files by considering a source of the data. For example, the clustered storage system 180 may ensure (e.g. to an extent determined by a predefined distribution policy) that data originating from a particular granular data source is stored together on the same deduplication domain 470. Accordingly, the clustered storage system 180 may obtain a higher degree of deduplication efficiency as the likelihood of data being related (e.g. deduplicable) may increase if originating from the same data source.

To provide the ability for the clustered storage system 180 to intelligently distribute backup data amongst deduplication domains 470, the backup component 150 may provide (e.g. transmit, send, transfer, inject, input, etc.) a data source identifier to the clustered data storage system 180. Accordingly, as shown 451, the clustered storage system 180 may receive the data source identifier. In some embodiments, the data source identifier may be in the form of a placement tag. This data source identifier (e.g. placement tag) may be received by the clustered storage system 180 along with the associated (or corresponding) portion of backup data as shown in 452. In some embodiments, the data source identifier may be received at the same time as the backup data (e.g. as part of the data, or as an input to an operation), or the data source identifier may be received separately or at a different time from when the backup data is received by the clustered storage system 180.

As described, the clustered storage system 180 may receive the data source identifier in various ways. In some embodiments, the data source identifier may be received as an input to an operation that writes (or creates) a backup file to the clustered storage system 180. For example, the input may include the data source identifier as an argument to an operation (e.g. function, method, class, etc.) that initiates the creation of a backup file to the clustered storage system 180. In some embodiments, the backup component 150 may initiate creation of a backup file using an API provided by the clustered storage system 180. For example, the clustered storage system 180 (e.g. as part of DDS 302) may provide an API (e.g. API 304) to access a storage layer (or protocol) to which the data source identifier may be passed along with a portion of data to be used to create a backup file. Accordingly, in some embodiments, the data source identifier may be provided to the clustered storage system 180 at the time of a backup file write request. Accordingly, the file write may be performed by the clustered storage system 180 directly to a particular deduplication domain (e.g. storage node) via the backup component 150.

In some embodiments, the data source identifier may be received directly to a file system or namespace managed by the clustered storage system 180. For example, the backup component 150 may provide a data source identifier by setting (or specifying) the identifier as a file attribute. In another example, the backup component 150 may provide the data source identifier by specifying the identifier as part of metadata (e.g. metadata attribute, metadata file, index, database, etc.) associated with a backup file. Accordingly, the clustered storage system 180 may store the data source identifier in some form of index (e.g index 314) that is managed, maintained, and/or referenced by the clustered storage system 180. For example, the index may include an index file or an index database of a file system of the clustered storage system. In addition, the index may include an index node (e.g. inode) that may be referenced when performing file operations (e.g. reading/writing backup files). For example, the index node may include a separate (or independent) specialized node that is provided to primarily (or exclusively) store index information instead of backup data or files as with other nodes. In addition, in some embodiments, the data source identifier may be written to an index maintained by the backup component 150, and the index may be provided as a separate index file (or other file format) to the clustered storage system 180. The separate index file may then be incorporated into the index maintained by the clustered storage system 180.

Once the data source identifier is received, the clustered storage system 180 (e.g. via cluster workload balancer 206) may then use such information to intelligently distribute the backup files amongst a set of deduplication domains 470. As described, the clustered storage system 180 may implement a global namespace, and accordingly, data source information may be used to store related backup files on a particular deduplication domain despite the system appearing as a single system to external components. The backup file may be distributed for storage at the time of creation (e.g. write), or after the time of creation. For example, the system may set attributes (e.g. using a set attribute operation) of an empty file used for, or associated with, a subsequently created backup file which may be used to distributed the backup file to an appropriate deduplication domain after the backup is created. As described, in some embodiments, the data source identifier may be stored in manner to improve performance of the system. For example, the data source identifier may be stored within an index maintained by clustered storage system 180. For instance, access to a backup file may include loading an index node into memory (e.g. cache), and therefore, the data source information may be available to file access requests (e.g. read and/or write requests) without requiring the utilization of additional resources. In some embodiments, the data source identifier may also be stored as extended attributes of a file system, namespace, or other persistent form of file-specific information maintained by the clustered storage system 180.

In addition, as part of a storage and/or writing process of the backup file, the data source information may be accessed directly by the node (e.g. via API 304) as part of backup file write process. For example, the clustered storage system 180 may traverse an index to determine whether a deduplication domain 470 already stores data originating from the same data source as a to-be-created backup file. In some embodiments, the data source identifiers may be stored as an attribute on lower layers of the file system that implement the global namespace (e.g. GNS 208).

When a backup file is created (e.g. via a write operation), the clustered storage system may use the data source identifier to select a destination deduplication domain 470 for the backup file using a mapping that associates backup files to particular deduplication domains. For example, the clustered storage system may direct a backup file to a particular destination to ensure that all backup files associated with a particular data protection set are stored within the same deduplication domain 470. Accordingly, in some embodiments, a component can continue to perform file operations on a particular backup file because the clustered storage system 180 redirects such requests to a particular storage node 212 that is storing (or hosting) the particular backup file. Accordingly, such a configuration may maintain the deduplication efficiency using various deduplication schemes. For example, for virtual synthetic based workloads, storing backup files of a particular data protection set on the same deduplication domain 470 ensures that file operation requests incorporate extents from older backup files that can be serviced locally in the same deduplication domain 470. With change block tracking (CBT) workloads, the clustered storage system 180 (e.g. via the file system) may ensure that a request to copy a previous backup file is redirected to the correct storage node storing the older backup file. Accordingly, the newly created (e.g. copied) backup file may incorporate the same data source identifier as the source backup file (e.g. older backup file). Thus, the backup application can continue to overwrite the blocks (or extents) that have changed since the previously created backup files onto the newly created backup files.

In some embodiments, the system may implement a particular distribution policy, or override a particular distribution policy, in certain circumstances. For example, if it is determined that a first backup file to be written does not have data from a same data source (e.g. same data protection set) already stored data within a particular deduplication domain 470, the system may perform a distribution based on a first distribution policy that disregards the data source identifier of the first backup file. For instance, the first distribution policy may perform a distribution solely based on a resource utilization (e.g. storage capacity, CPU usage, bandwidth, etc.). However, if it is determined that the first backup file to be written does in fact have data from the same data source already stored within a particular deduplication domain 470, the system may perform the distribution based on a second distribution policy that accounts for the data source identifier of the first backup file. For instance, the second distribution policy may prioritize grouping related data (or override the first distribution policy) so that irrespective of resource utilization, the first backup file is written to the deduplication domain 470 that already stores backup files from the same data source. Accordingly, in some embodiments, the system may perform an override to ensure that data from a particular data source gets grouped together on the same deduplication domain.

Figure 5:
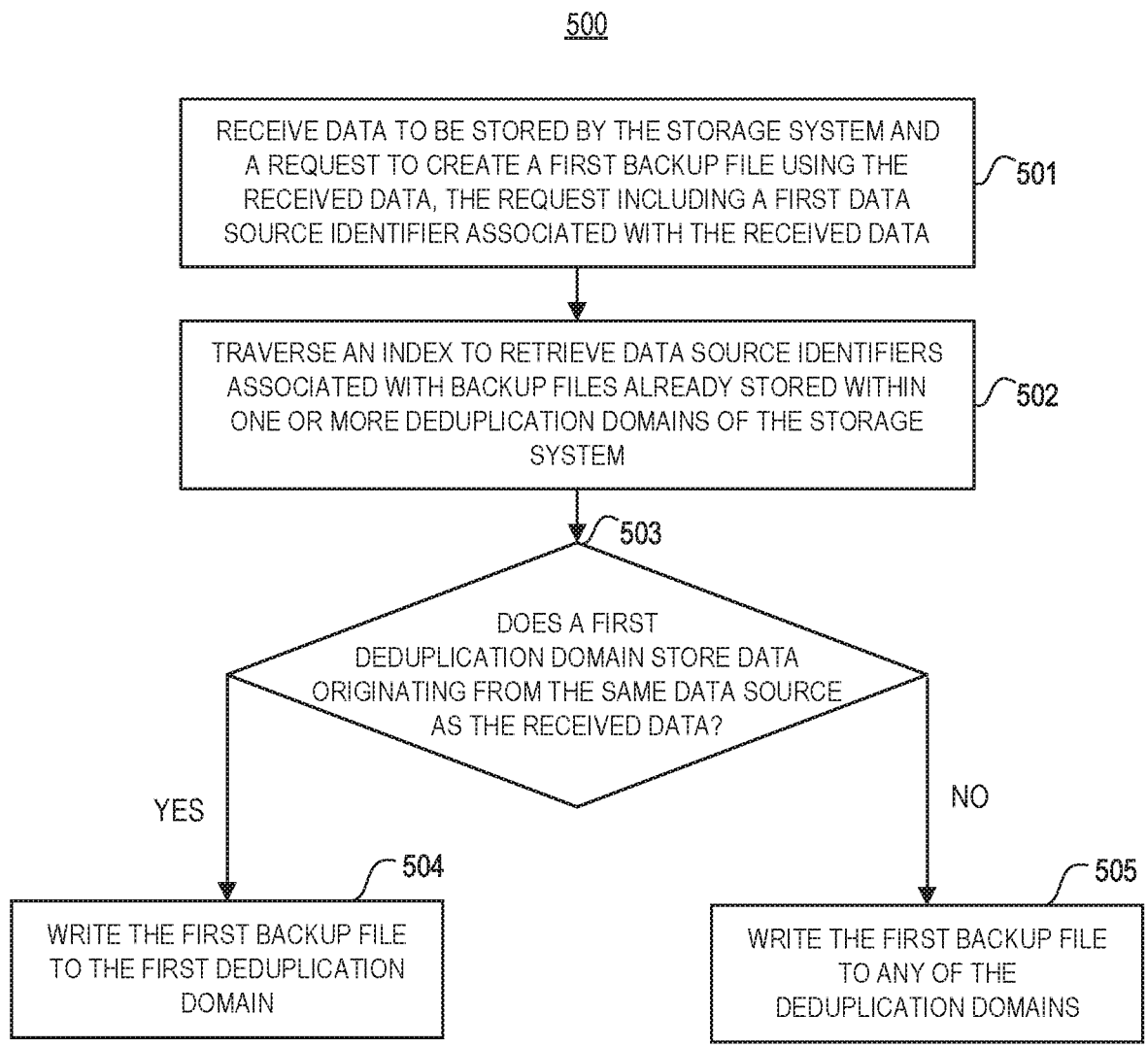
FIG. 5 is a flow diagram illustrating an example method of using data source information to distribute data within a clustered storage system according to one or more embodiments of the disclosure.

FIG. 5 is a flow diagram illustrating an example method of using data source information to distribute data within a clustered storage system according to one or more embodiments of the disclosure. Process 500 may use processing logic, which may include software, hardware, or a combination thereof. For example, process 500 may be performed by a system including one or more components described in operating environment 100 (e.g. clustered storage system 180, node 212, etc.).

In 501, the system (e.g. clustered storage system 180) may receive, from a backup application (e.g. backup component 150), data to be stored by the storage system and a request to create a first backup file using the received data. For example, the request may include a request to write the first backup file to the clustered storage system. In one embodiment, the request may include a first data source identifier associated with the received data. The received data may be associated with a data source identifier of the data source from which the data to be backed-up originates. For example, the received data may originate from a data source (e.g. data source 411-415) associated with a client system (e.g. client system 110).

As described, the first data source identifier may be used by the clustered storage system to determine a first destination deduplication domain for the first backup file created using the first portion of data. As described, a deduplication domain (e.g. deduplication domain 470) may be a particular storage node (e.g. one of storage nodes 212A-C), a partition within a particular node, or a storage partition associated with one or more storages nodes (e.g. a storage partition spanning multiple nodes).

In some embodiments, the clustered storage system may implement a global namespace that represents the clustered storage system as a single storage node to the system (e.g. backup component 150). Accordingly, the data source identifier may be used to group backup data from the same data source on the same node despite using a global namespace. In one embodiment, receiving the request to create the first backup file using the received data may include receiving the first data source identifier as an input to an operation to write the received data to the storage system. For example, the operation (e.g. function, method, class, etc.) may be provided by the storage system as part of an application programming interface (API) accessible to the backup application. For example, the API may include a write operation provided by a file system of the clustered storage system and the data source identifier may be provided as an argument to the write operation.

In one embodiment, the data source identifier may be provided as an attribute for a backup file. For example, the system may store the first data source identifier within a file system maintained by the system as an attribute associated with the first backup file. In addition, the attribute may be stored within the first backup file itself. In one embodiment, the backup application may inject (or write) the data source identifier directly to an index maintained by the clustered storage system and associated with the backup file. For example, the index may include an index node (e.g. inode) utilized by the clustered storage system. For example, the index node may include a separate (or independent) specialized node that is provided to primarily (or exclusively) store index information instead of backup data or files as with other nodes.

In 502, the system may traverse a file system to retrieve data source identifiers associated with backup file already stored by the storage system. For example, the system may traverse the file system in response to the request to create the first backup file. The file system (or other component) may maintain an index, attributes, or other data structure that stores associations between data source identifiers and a deduplication domain of backup files already stored by the storage system. Accordingly, in one embodiment, the system may traverse file attributes that may be stored by the file system. In addition, the file system may include, or be associated with, an index, which is traversed. As described, the index may include an index file or an index database of a file system of the clustered storage system. In addition, the index may be an index node that may be referenced when performing file operations (e.g. reading/writing backup files). Accordingly, in one embodiment, traversing the file system to retrieve data source identifiers may include accessing an index node of the file system and traversing the index node to retrieve data source identifiers associated with the backup files already stored within one or more deduplication domains of the storage system. In some embodiments, the performance of write operations may be improved by storing the data source identifiers in such an index. For example, in some configurations, any access to a backup file may require loading an associated index node into memory (e.g. cache). Accordingly, the data source identifier may be exposed to the system for file write requests without requiring any addition resource requirements. In one embodiment, the system may directly traverse an index node, which may or may not be part of the file system. In addition, in one embodiment, the system may traverse a global namespace, or a namespace layer of the file system to retrieve the data source identifiers. For example, the namespace or file system may include, or be associated with, an index.

In 503, the system may determine whether a deduplication domain already stores data originating from the same data source as the received data. For example, the system may compare the data source identifiers retrieved from the index with the data source identifier provided with the received data (e.g. first data source identifier). If there is a match, the system can predict that the received data is at least related (e.g. to a certain degree of probability) to the already stored data. For example, the received data and the already stored data may include different generations of data from the same data protection set. For instance, the already stored data may have been backed-up at a first time (e.g. a particular day), and the received data may be data to backed-up at a subsequent time (e.g. the next day) of the same originating data. Accordingly, in one embodiment, the system may determine a first deduplication domain stores data originating from the same data source if at least a second data source identifier associated with a second backup file already stored within the first deduplication domain matches the first data source identifier.

In 504, the system may write the first backup file to the first deduplication domain, in response to determining the first deduplication domain stores data originating from the same data source as the received data. For example, the system may group (consolidate, sort, etc.) data from a same originating data source on the same deduplication domain. In one embodiment, writing the first backup file to the first deduplication domain may be based on a distribution policy that prioritizes grouping backup files storing data originating from the same data source to a same deduplication domain over distributing backup files based on a resource utilization associated with the deduplication domains. For example, despite other deduplication domains (e.g. a second deduplication domain) having more storage capacity (or other resource), the system may instead store the first backup file on the first deduplication domain because it already stores data from the same data protection set as the first backup file.

Alternatively, in 505, the system may write the first backup file to any of the deduplication domains of the storage system, in response to determining none of the deduplication domains already store data originating from the same data source as the received data. In one embodiment, writing the first backup file to any of the deduplication domains of the storage system may be based on the distribution policy that prioritizes distributing backup files to deduplication domains based on the resource utilization associated with the deduplication domains without further regard to the data source identifier associated with the received data. For example, once the data source identifier of the first backup file is used to perform a search to determine whether there are any data source identifiers that match, the system may perform a distribution without considering the data source identifier. Put another way, the system may perform a write of the first backup file as if the data source identifier was never provided to the clustered storage system.

Accordingly, in some embodiments, described is a system that may leverage granular data source identifiers associated with data to intelligently distribute data within a clustered storage system to obtain deduplication storage efficiency.

Figure 6:
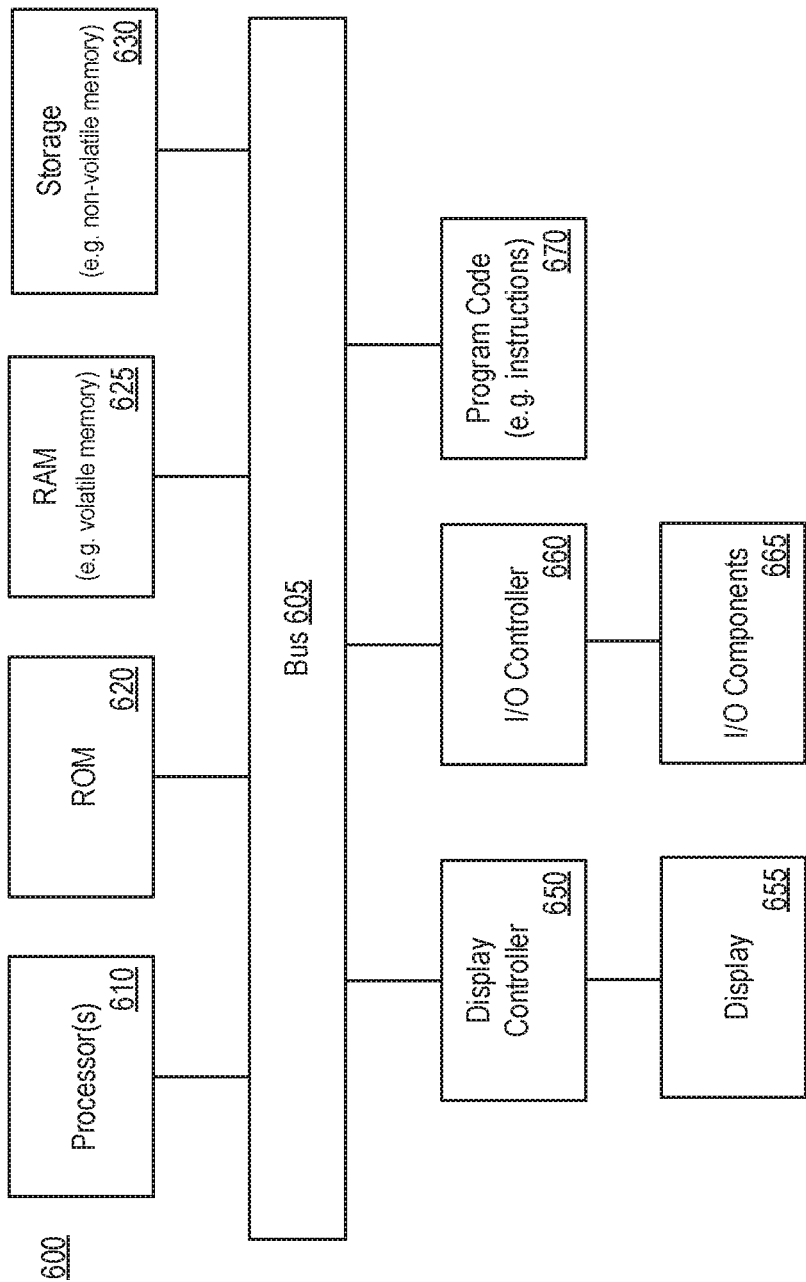
FIG. 6 is a block diagram illustrating an example of a computing system that may be used in conjunction with one or more embodiments of the disclosure.

FIG. 6 shows a block diagram of an example of a computing system that may be used in conjunction with one or more embodiments of the disclosure. For example, computing system 600 (or system, or server, or computing device, or device) may represent any of the devices or systems (e.g. clustered storage system 180, node 212, CWB 206, CSP 210, etc.) described herein that perform any of the processes, operations, or methods of the disclosure. Note that while the computing system 600 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 600 may include a bus 605 which may be coupled to a processor 610, ROM (Read Only Memory) 620, RAM (or volatile memory) 625, and storage (or non-volatile memory) 630. The processor(s) 610 may retrieve stored instructions from one or more of the memories 620, 625, and 630 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 610 may perform operations in an on-demand or "cloud computing" environment or as a service (e.g. within a "software as a service" (SaaS) implementation). Accordingly, the performance of operations may be distributed among the one or more processors 610, whether residing only within a single machine or deployed across a number of machines. For example, the one or more processors 610 may be located in a single geographic location (e.g. within a home environment, an office environment, or a server farm), or may be distributed across a number of geographic locations. The RAM 625 may be implemented as, for example, dynamic RAM (DRAM), or other types of memory that require power continually in order to refresh or maintain the data in the memory. Storage 630 may include, for example, magnetic, semiconductor, tape, optical, removable, non-removable, and other types of storage that maintain data even after power is removed from the system. It should be appreciated that storage 630 may be remote from the system (e.g. accessible via a network).

A display controller 650 may be coupled to the bus 605 in order to receive display data to be displayed on a display device 655, which can display any one of the user interface features or embodiments described herein and may be a local or a remote display device. The computing system 600 may also include one or more input/output (I/O) components 665 including mice, keyboards, touch screen, network interfaces, printers, speakers, and other devices. Typically, the input/output components 665 are coupled to the system through an input/output controller 660.

Program code 670 may represent any of the instructions, applications, software, libraries, toolkits, modules, components, engines, units, functions, logic, etc. as described herein (e.g. clustered storage system 180, node 212, CWB 206, CSP 210, etc.). Program code 670 may reside, completely or at least partially, within the memories described herein (e.g. non-transitory computer-readable media), or within a processor during execution thereof by the computing system. Program code 670 may include both machine code, such as produced by a compiler, and files containing higher-level or intermediate code that may be executed by a computing system or other data processing apparatus (or machine) using an interpreter. In addition, program code 670 can be implemented as software, firmware, or functional circuitry within the computing system, or as combinations thereof. Program code 670 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that the term "approximately" or "substantially" may be used herein and may be interpreted as "as nearly as practicable," "within technical limitations," and the like. In addition, the use of the term "or" indicates an inclusive or (e.g. and/or) unless otherwise specified. Reference to ordinal numbers such as "first," "second," "third," etc. may indicate an adjective for an element (e.g. any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A storage system comprising:
one or more processors; and
a non-transitory computer readable medium storing a plurality of instructions, which when executed, cause the one or more processors to:
receive, from a backup application, data to be stored by the storage system;
receive, from the backup application, a request to create a first backup file using the received data, wherein receiving the request to create the first backup file includes receiving a first data source identifier associated with the received data in a form of an argument to an operation that initiates the creation of a backup file to the storage system, the operation provided to the backup application by the storage system as part of an programming interface (API), the first data source identifier including an identity of a device from which the received data was obtained, the device being one of a plurality of devices that are components of a client system;
traverse a file system to retrieve data source identifiers associated with backup files already stored within one or more deduplication domains of the storage system, in response to the request to create the first backup file;
determine a first deduplication domain stores data originating from the same device as the received data if at least a second data source identifier associated with a second backup file already stored within the first deduplication domain matches the first data source identifier; and
write the first backup file to the first deduplication domain, in response to determining the first deduplication domain stores data originating from the same device as the received data.

2. The system of claim 1, wherein writing the first backup file to the first deduplication domain is based on a distribution policy that prioritizes grouping backup files storing data originating from the same data source to a same deduplication domain over distributing backup files based on a resource utilization associated with the deduplication domains.

3. The system of claim 2, wherein the plurality of instructions, when executed, further cause the one or more processors to:
determine none of the deduplication domains store data originating from the same data source as the received data if none of the data source identifiers associated with the backup files already stored in the deduplication domains of the storage system match the first data source identifier; and
write the first backup file to any of the deduplication domains of the storage system, in response to determining no deduplication domain stores data originating from the same data source as the received data.

4. The system of claim 3, wherein writing the first backup file to any of the deduplication domains of the storage system is based on the distribution policy that prioritizes distributing backup files to deduplication domains based on the resource utilization associated with the deduplication domains without further regard to the data source identifier associated with the received data.

5. The system of claim 1, wherein traversing the file system to retrieve the data source identifiers includes accessing an index node of the file system and traversing the index node to retrieve the data source identifiers.

6. The system of claim 1, wherein the plurality of instructions, when executed, further cause the one or more processors to:
store the first data source identifier within the file system maintained by the system as an attribute associated with the first backup file.

7. The system of claim 1, wherein the storage system comprises a clustered storage system, and each deduplication domain comprises a storage node, or a storage partition associated with one or more storages nodes.

8. A method comprising:
receiving, from a backup application, data to be stored by the storage system;
receiving, from the backup application, a request to create a first backup file using the received data, wherein receiving the request to create the first backup file includes receiving a first data source identifier associated with the received data, the first data source identifier including an identity of a device from which the received data was obtained, the device being one of a plurality of devices that are components of a client system;
traversing, by the storage system, a file system to retrieve data source identifiers associated with backup files already stored within one or more deduplication domains of the storage system, in response to the request to create the first backup file;
determining, by the storage system, a first deduplication domain stores data originating from the same data source as the received data if at least a second data source identifier associated with a second backup file already stored within the first deduplication domain matches the first data source identifier; and
writing, by the storage system, the first backup file to the first deduplication domain, in response to determining the first deduplication domain stores data originating from the same data source as the received data.

9. The method of claim 8, wherein writing the first backup file to the first deduplication domain is based on a distribution policy that prioritizes grouping backup files storing data originating from the same data source to a same deduplication domain over distributing backup files based on a resource utilization associated with the deduplication domains.

10. The method of claim 9, further comprising:
determining none of the deduplication domains store data originating from the same data source as the received data if none of the data source identifiers associated with the backup files already stored in the deduplication domains of the storage system match the first data source identifier; and
writing the first backup file to any of the deduplication domains of the storage system, in response to determining no deduplication domain stores data originating from the same data source as the received data.

11. The method of claim 10, wherein writing the first backup file to any of the deduplication domains of the storage system is based on the distribution policy that prioritizes distributing backup files to deduplication domains based on the resource utilization associated with the deduplication domains without further regard to the data source identifier associated with the received data.

12. The method of claim 8, wherein traversing the file system to retrieve the data source identifiers includes accessing an index node of the file system and traversing the index node to retrieve the data source identifiers.

13. A computer program product comprising a non-transitory computer-readable medium having a computer-readable program code embodied therein to be executed by one or more processors, the program code including instructions to:
- receive, from a backup application, data to be stored by the storage system;
- receive, from the backup application, a request to create a first backup file using the received data, wherein receiving the request to create the first backup file includes receiving a first data source identifier associated with the received data, the first data source identifier including an identity of a device from which the received data was obtained, the device being one of a plurality of devices that are components of a client system;
- traverse a file system to retrieve data source identifiers associated with backup files already stored within one or more deduplication domains of the storage system, in response to the request to create the first backup file;
- determine a first deduplication domain stores data originating from the same data source as the received data if at least a second data source identifier associated with a second backup file already stored within the first deduplication domain matches the first data source identifier; and
- write the first backup file to the first deduplication domain, in response to determining the first deduplication domain stores data originating from the same data source as the received data.

14. The computer program product of claim 13, wherein writing the first backup file to the first deduplication domain is based on a distribution policy that prioritizes grouping backup files storing data originating from the same data source to a same deduplication domain over distributing backup files based on a resource utilization associated with the deduplication domains.

15. The computer program product of claim 14, wherein the program code includes further instructions to:
- determine none of the deduplication domains store data originating from the same data source as the received data if none of the data source identifiers associated with the backup files already stored in the deduplication domains of the storage system match the first data source identifier; and
- write the first backup file to any of the deduplication domains of the storage system, in response to determining no deduplication domain stores data originating from the same data source as the received data.

16. The computer program product of claim 15, wherein writing the first backup file to any of the deduplication domains of the storage system is based on the distribution policy that prioritizes distributing backup files to deduplication domains based on the resource utilization associated with the deduplication domains without further regard to the data source identifier associated with the received data.

17. The computer program product of claim 13, wherein traversing the file system to retrieve the data source identifiers includes accessing an index node of the file system and traversing the index node to retrieve the data source identifiers.

* * * * *